(12) United States Patent
Guo et al.

(10) Patent No.: US 12,546,988 B2
(45) Date of Patent: Feb. 10, 2026

(54) OPTICAL EYEPIECE SYSTEM CAPABLE OF SUPERIMPOSING OPTICAL PATHS AND HEAD-MOUNTED DISPLAY DEVICE

(71) Applicant: SHENZHEN NADE OPTICAL CO., LTD., Guangdong (CN)

(72) Inventors: Jianfei Guo, Guangdong (CN); Hongpeng Cao, Guangdong (CN); Huajun Peng, Guangdong (CN)

(73) Assignee: SHENZHEN NADE OPTICAL CO., LTD., Shenzhen (CN)

( * ) Notice: Subject to any disclaimer, the term of this patent is extended or adjusted under 35 U.S.C. 154(b) by 376 days.

(21) Appl. No.: 18/215,842

(22) Filed: Jun. 29, 2023

(65) Prior Publication Data

US 2023/0341674 A1    Oct. 26, 2023

Related U.S. Application Data

(63) Continuation of application No. PCT/CN2020/142552, filed on Dec. 31, 2020.

(51) Int. Cl.
| | |
|---|---|
| *G02B 25/00* | (2006.01) |
| *G02B 9/14* | (2006.01) |
| *G02B 13/18* | (2006.01) |
| *G02B 27/01* | (2006.01) |

(52) U.S. Cl.
CPC ............ *G02B 25/001* (2013.01); *G02B 9/14* (2013.01); *G02B 13/18* (2013.01); *G02B 27/0101* (2013.01)

(58) Field of Classification Search
CPC ........ G02B 25/001; G02B 9/14; G02B 13/18; G02B 7/0101; G02B 25/00; G02B 27/01; G02B 27/0172; G02B 27/10
See application file for complete search history.

(56) References Cited

U.S. PATENT DOCUMENTS

| | | | |
|---|---|---|---|
| 2009/0213376 A1* | 8/2009 | Takatsuka | G02B 27/144 356/364 |
| 2012/0092300 A1* | 4/2012 | Wang | G06F 3/011 345/175 |
| 2017/0242223 A1* | 8/2017 | Chen | G02B 3/04 |
| 2020/0183167 A1* | 6/2020 | Cheng | G02B 27/0172 |
| 2020/0249454 A1* | 8/2020 | Kobayashi | G01J 3/10 |

* cited by examiner

*Primary Examiner* — Thomas K Pham
*Assistant Examiner* — Justin W. Hustoft

(57) ABSTRACT

An optical eyepiece system capable of superimposing optical paths and a head-mounted display device. The optical eyepiece system comprises an image surface (103), an auxiliary optical path (T), a spectroscope (101), and a main optical path (A) which are sequentially connected; an optical axis of the image surface (103) coincides; an optical axis of the main optical path (A) is mutually perpendicular to the optical axis of the auxiliary optical path (T); and the optical axis of the main optical path (A) is reflected by the spectroscope (101) and is superimposed with the auxiliary optical path (T) transmitted by the spectroscope (101). An image displayed on the micro image display (102) and a physical object image captured by an object shape observation and photographing apparatus are displayed in a superimposing mode, and characteristics of being clearer in imaging, small in distortion, and high in imaging quality are achieved.

13 Claims, 11 Drawing Sheets

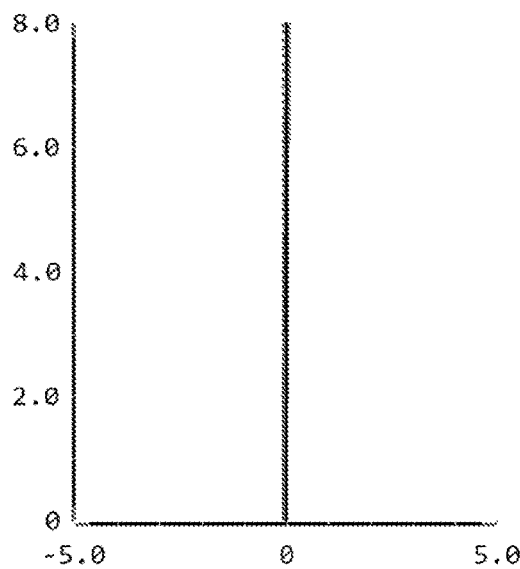
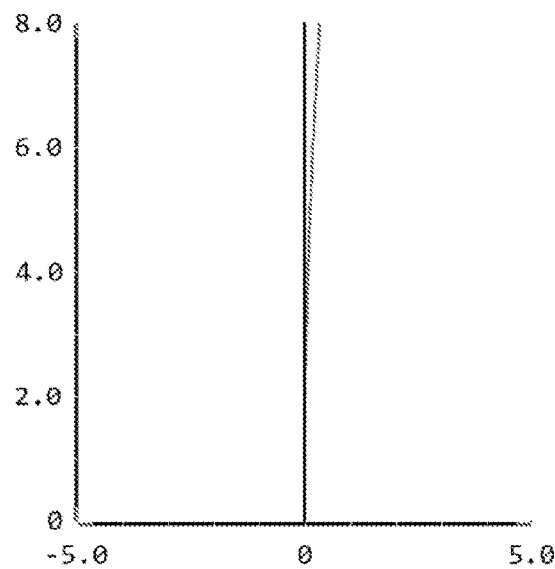
FIG. 14A  FIG. 14B
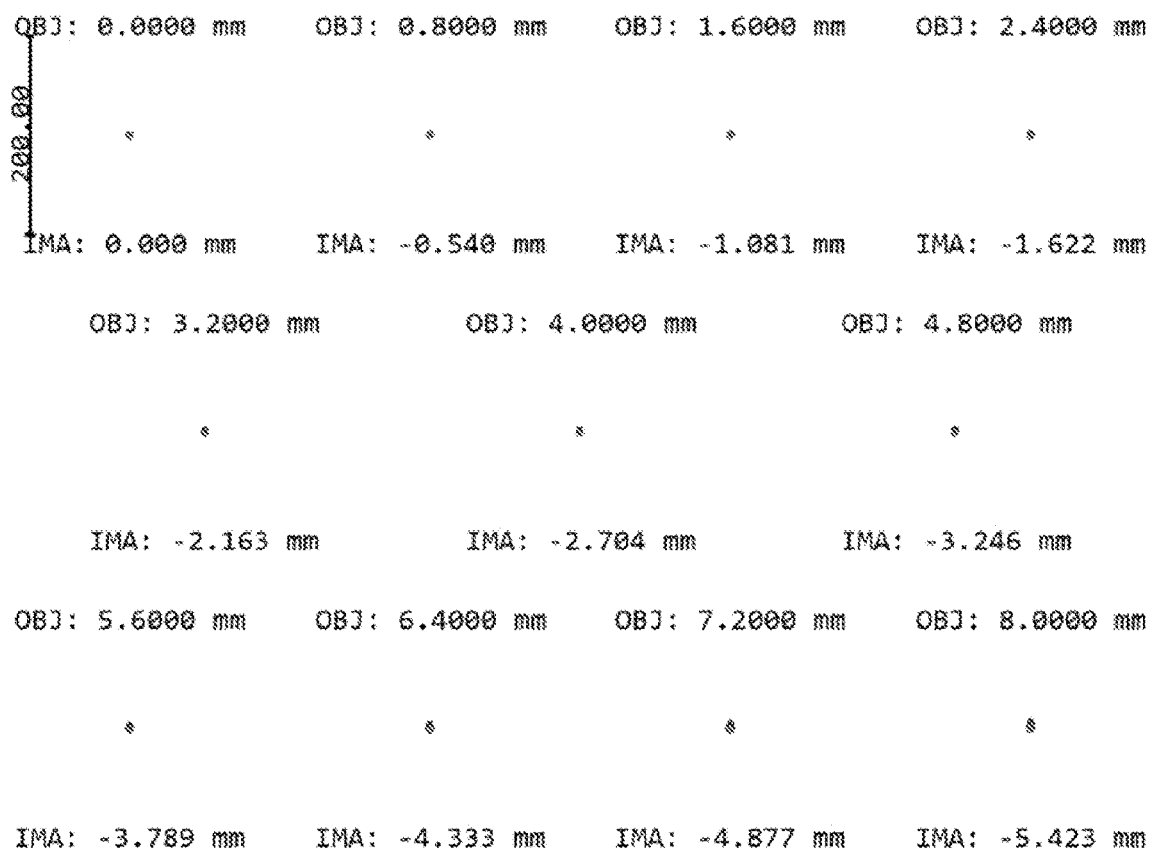
FIG. 15

OPTICAL EYEPIECE SYSTEM CAPABLE OF SUPERIMPOSING OPTICAL PATHS AND HEAD-MOUNTED DISPLAY DEVICE

CROSS REFERENCE TO RELATED APPLICATIONS

The present application is a Continuation Application of PCT Application No. PCT/CN2020/142552 filed on Dec. 31, 2020, the contents of which are incorporated herein by reference in their entirety.

TECHNICAL FIELD

The present invention relates to the field of optical technologies, and more specifically, to an optical eyepiece system capable of superimposing optical paths and a head-mounted display device.

BACKGROUND

With the continuous improvement of science and technology, people use some high-end optical instruments more frequently. However, many optical instruments in the current market have special requirements for users, and require the users to have relevant knowledge reserves to be familiar with the use, which greatly narrows the user base.

For example, in a process of using an optical imaging instrument such as a telescope and a night-vision device for an amateur in the optical industry, the user is often unfamiliar with an object observed and needs to constantly use books or online devices to inquire about information of the observed object. There may even be a situation where corresponding object information cannot be found. This situation results in the user spending a lot of time searching for information during use, which greatly reduces the interest of the user in using the high-end instrument.

As the number of people using high-end optical instruments increases, an entry barrier for high-end optical instruments needs to be lowered. The main challenge is how to familiarize users with the use of instruments without changing original functions thereof.

SUMMARY

The technical problem to be solved by the present invention is the fact that existing optical systems are all fixed-focus optical systems, which are difficult to satisfy requirements of most consumers. At the same time, the weight of the optical system is too heavy and the volume thereof is too large. To solve the aforementioned defects of the existing technologies, an optical eyepiece system capable of superimposing optical paths and a head-mounted display device are provided.

A technical solution adopted by the present invention to solve the technical problem is: constructing an optical eyepiece system capable of superimposing optical paths, comprising an image face, an auxiliary optical path, a spectroscope, and a main optical path which are sequentially connected; wherein an optical axis of the image surface coincides with an optical axis of the auxiliary optical path; an optical axis of the main optical path is perpendicular to the optical axis of the auxiliary optical path; and the optical axis of the main optical path is reflected by the spectroscope and is superimposed with the auxiliary optical path transmitted by the spectroscope;

the main optical path comprises a first lens, a second lens, and a third lens which are arranged sequentially from the spectroscope to a micro image display in an optical axis direction; the first lens is a positive lens; the second lens is a negative lens; and the third lens is a positive lens;

the auxiliary optical path comprises a fourth lens, a fifth lens, and a sixth lens which are arranged sequentially from the image surface to the spectroscope in the optical axis direction; and an effective focal length of the optical system is set to F, an effective focal length of the main optical path is set to $F_1$, and an effective focal length of the auxiliary optical path is set to $F_f$, and F, $F_1$, and $F_f$ satisfy the following relations (1) and (2):

$$0.558 \leq F_1/F \leq 1.822 \quad (1); \text{ and}$$

$$2.265 \leq F_f/F \leq 3.493 \quad (2).$$

Further, the effective focal length of the main optical path is $F_1$, the effective focal length of the auxiliary optical path is $F_f$, and $F_1$ and $F_f$ satisfy the following relation (3):

$$1.413 \leq F_f/F_1 \leq 4.63 \quad (3).$$

Further, an image height of the image surface is set to H, an image height of the micro image display is set to h, and H and h satisfy the following relation (4):

$$0.346 \leq h/H \leq 0.716 \quad (4).$$

Further, the light reflectivity of the spectroscope is set to μ, the transmissivity of the spectroscope is n, and μ and n satisfy the following relation (5):

$$80\% \leq \mu + n \leq 100\% \quad (5).$$

Further, an included angle between the optical axes of the main optical path and the auxiliary optical path is set to θ, and θ satisfies the following relation (6):

$$\Theta < 80° \quad (6).$$

Further, an optical surface of the first lens away from the side of the micro image display is concave towards a direction of the micro image display, and the optical surface is an even-order aspherical face shape.

Further, the fourth lens is a negative lens; and the fifth lens and the sixth lens are positive lenses.

Further, an optical surface of the second lens near the side of the micro image display is concave towards the direction of the micro image display, and the optical surface is a spherical face shape.

Further, a calculation formula of the aspherical face shape is:

$$z = \frac{cr^2}{1 + \sqrt{1-(1+k)c^2r^2}} + \alpha_2 r^2 + \alpha_4 r^4 + \alpha_6 r^6 + \dots.$$

Further, substrate materials of the spectroscope, the main optical path, and the lenses in the auxiliary optical path are all optical glass materials.

The present invention further provides a head-mounted display device, comprising a micro image display and an object shape observation and photographing apparatus, and further comprising the optical eyepiece system according to any one of the above contents.

Further, the micro image display comprises an organic electroluminescent light-emitting device, a transmissive liquid crystal display, or a reflective liquid crystal display.

Further, the object shape observation and photographing apparatus comprises but is not limited to a microscope or a telescope.

The beneficial effect of the present invention is that: imaging light is superimposed in a semi-transparent and semi-reflective manner, the optical axis of the main optical path is reflected by the spectroscope and then superimposed with the optical axis of the auxiliary optical path projected by the spectroscope, an image displayed by the micro image display and a physical object image captured by an object shape observation and photographing apparatus are displayed in a superimposing mode, and effects of high definition and high coincidence are achieved through a positive, negative, and positive lens combination and the feature relationships among optical components, thereby achieving the characteristics of being clearer in imaging, small in distortion, and high in imaging quality, so that the imaging of the micro image display and the imaging and superimposing of dual optical paths are more perfectly realistic.

BRIEF DESCRIPTION OF DRAWINGS

To describe the technical solutions in the embodiments of the present invention or the prior art more clearly, the present invention will be further illustrated in the following with reference to accompanying drawings and embodiments. The accompanying drawings described in the following description are merely some embodiments of the present invention, and those of ordinary skill in the art can still derive other drawings from these accompanying drawings without creative efforts.

FIG. 14A is a plot of the field of the optical eyepiece system according to Example 4 of the present invention, and FIG. 14B is a plot of the distortion of the optical eyepiece system according to Example 4 of the present invention;

FIG. 15 is a schematic spot array diagram of the optical eyepiece system according to Example 4 of the present invention.

DETAILED DESCRIPTION OF THE EMBODIMENTS

Figure 1:
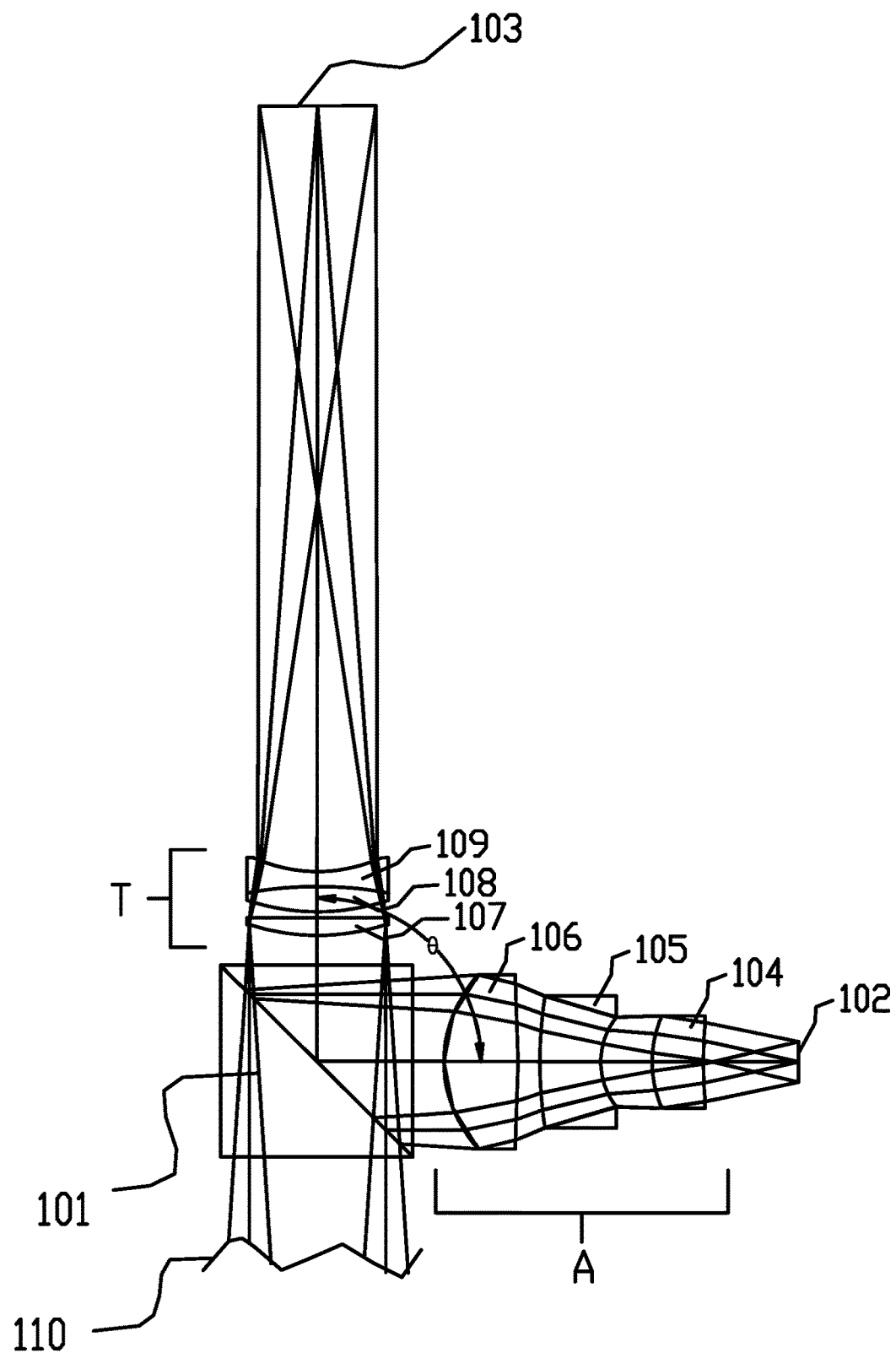
FIG. 1 is an optical path diagram of an optical eyepiece system according to Example 1 of the present invention.
Figure 2A:
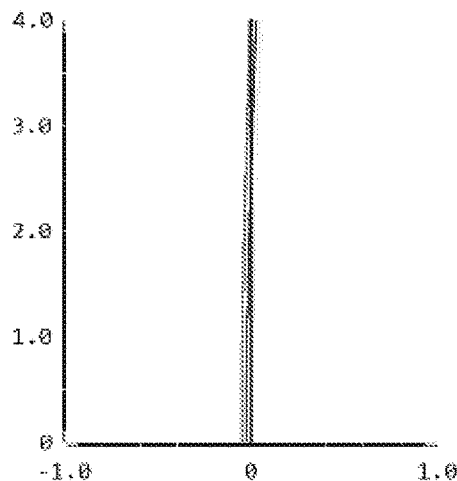
FIG. 2A is a plot of the field of the optical eyepiece system according to Example 1 of the present invention.
Figure 2B:
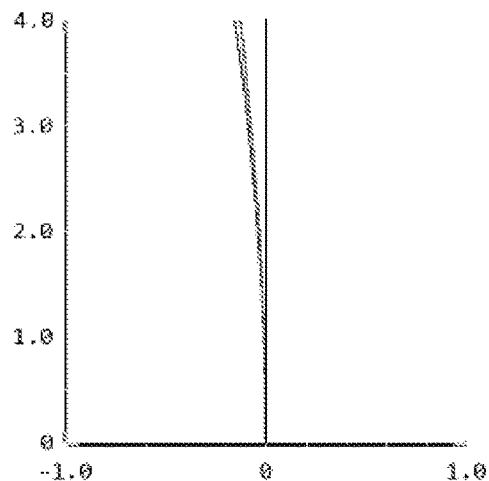
FIG. 2B is a plot of the distortion of the optical eyepiece system according to Example 1 of the present invention.
Figure 3:
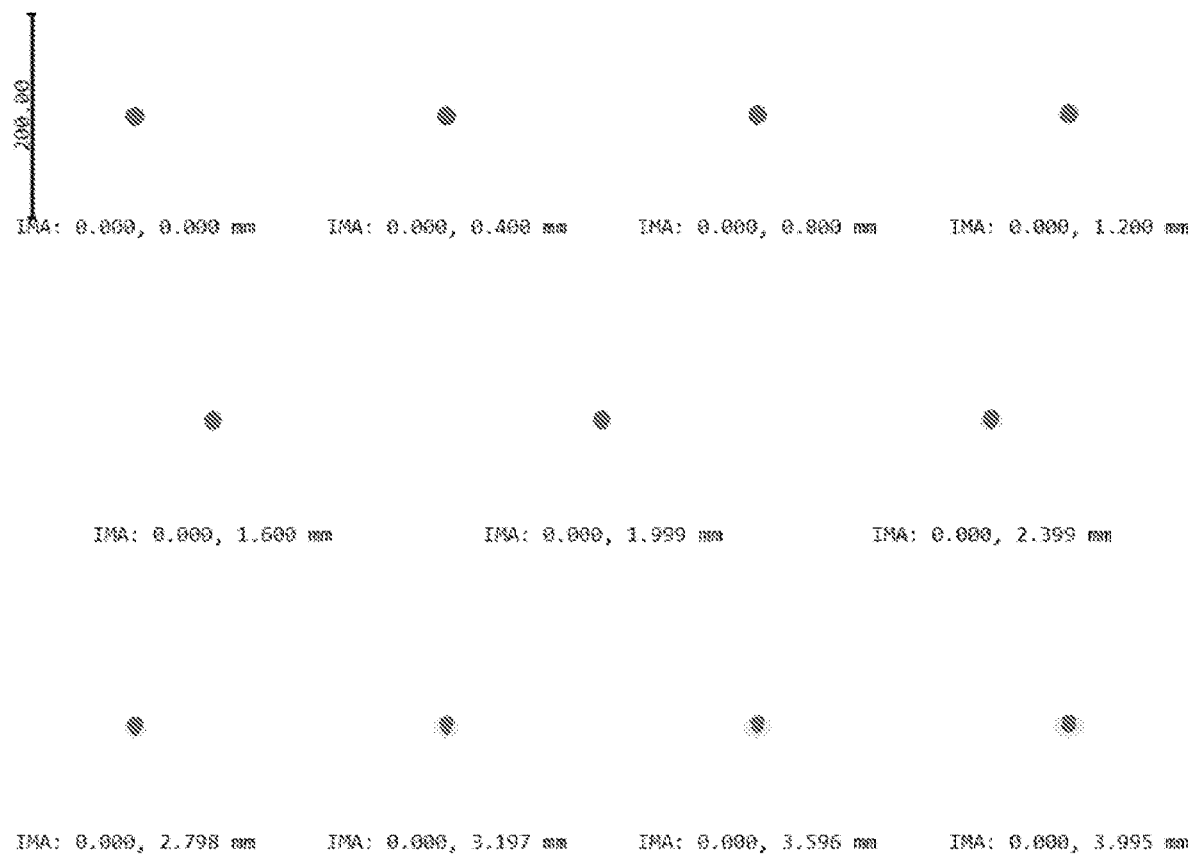
FIG. 3 is a schematic spot array diagram of the optical eyepiece system according to Example 1 of the present invention.
Figure 4:
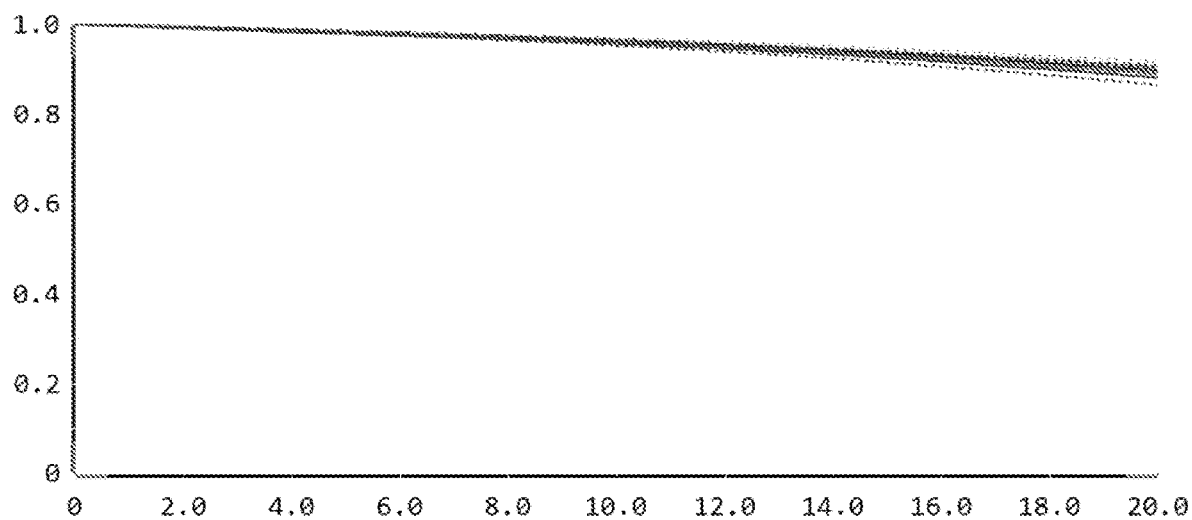
FIG. 4 is a plot of an optical modulation transfer function (MTF) of the optical eyepiece system according to Example 1 of the present invention.

In order to make objectives, technical solutions, and advantages of the embodiments of the present invention clearer, the technical solutions in embodiments of the present application will be described clearly and completely below. It is apparent that the described embodiments are a part of, rather than all, embodiments of the present invention. Based on the embodiments of the present invention, all other embodiments derived by those of ordinary skill in the art without any creative efforts fall within the protection scope of the present invention.

An optical eyepiece system capable of superimposing optical paths is constructed in the present invention, including an image surface, an auxiliary optical path, a spectroscope, and a main optical path which are sequentially connected; wherein an optical axis of the image surface coincides with an optical axis of the auxiliary optical path; an optical axis of the main optical path is perpendicular to the optical axis of the auxiliary optical path; and the optical axis of the main optical path is reflected by the spectroscope and is superimposed with the auxiliary optical path transmitted by the spectroscope;

the main optical path includes a first lens, a second lens, and a third lens which are arranged sequentially from the spectroscope to a micro image display in an optical axis direction; the first lens is a positive lens; the second lens is a negative lens; and the third lens is a positive lens;

the auxiliary optical path includes a fourth lens, a fifth lens, and a sixth lens which are arranged sequentially from the image surface to the spectroscope in the optical axis direction; and an effective focal length of the optical system is set to F, an effective focal length of the main optical path is set to $F_1$, and an effective focal length of the auxiliary optical path is set to $F_t$, and F, $F_1$, and $F_t$ satisfy the following relations (1) and (2):

$$0.558 \leq F_1/F \leq 1.822 \quad (1); \text{and}$$

$$2.265 \leq F_t/F \leq 3.493 \quad (2).$$

A value of $F_1/F$ may be 0.558, 0.7, 0.81, 0.833, 0.954, 1.12, 1.32, 1.57, 1.822, and the like, while $F_t/F$ may take a value of 2.265, 2.34, 2.57, 2.67, 2.89, 3.11, 3.32, 3.493, and the like.

Value ranges for $F_1/F$ and $F_t/F$ in the above relations (1) and (2) are closely related to correction of a system aberration, the difficulty in optical element processing, and the sensitivity of an optical element assembly deviation. The value of $F_1/F$ in the relation (1) is greater than −0.558, which allows sufficient correction of the system aberration and achieves a high-quality optical effect, and the value is less than 1.822, thereby improving the machinability of optical elements in the system. The value of $F_t/F$ in the relation (2) is greater than 2.265, which improves the machinability of the optical elements in the system, and the value is less than 3.493, which allows full correction of the system aberration, thereby achieving a better optical effect.

In the above embodiment, the semi-transparent and semi-reflective property of the spectroscope is adopted, the optical axis of the main optical path is reflected by the spectroscope and then superimposed with the optical axis of the auxiliary optical path projected by the spectroscope, an image displayed by the micro image display and a physical object image captured by an object shape observation and photographing apparatus are displayed in a superimposing mode, and effects of high definition and high coincidence are achieved through a positive, negative, and positive lens combination and the feature relationships among optical components, thereby achieving the characteristics of being clearer in imaging, small in distortion, and high in imaging quality, so that the imaging of the micro image display and the imaging and superimposing of dual optical paths are more perfectly realistic.

In a further embodiment, the effective focal length of the main optical path is $F_1$, the effective focal length of the auxiliary optical path is $F_t$, and $F_1$ and $F_t$ satisfy the following relation (3):

$$1.413 \leq F_t/F_1 \leq 4.63 \qquad (3).$$

A value of $F_t/F$ may be 1.413, 1.512, 1.784, 1.95, 2.111, 2.135, 3.12, 3.354, 3.785, 3.987, 4.12, 4.63, and the like.

In a further embodiment, an image height of the image surface is set to H, an image height of the micro image display is set to h, and H and h satisfy the following relation (4):

$$0.346 \leq h/H \leq 0.716 \qquad (4).$$

A value of h/H may be 0.346, 0.461, 0.478, 0.557, 0.578, 0.613, 0.655, 0.689, 0.716, and the like.

In a further embodiment, the light reflectivity of the spectroscope is set to $\mu$, the transmissivity of the spectroscope is n, and $\mu$ and n satisfy the following relation (5):

$$80\% \leq \mu + n \leq 100\% \qquad (5).$$

A value of $\mu$+n may be 80%, 85%, 88.5%, 89.1%, 91.2%, 99%, 100%, and the like.

In a further embodiment, an included angle between the optical axes of the main optical path and the auxiliary optical path is set to $\theta$, and $\theta$ satisfies the following relation (6):

$$\Theta < 180° \qquad (6).$$

In a further embodiment, an optical surface of the first lens away from the side of the micro image display is concave towards a direction of the micro image display, and the optical surface is an even-order aspherical face shape.

In a further embodiment, the fourth lens is a negative lens; and the fifth lens and the sixth lens are positive lenses.

In a further embodiment, an optical surface of the second lens near the side of the micro image display is concave towards the direction of the micro image display, and the optical surface is a spherical face shape.

The aberrations such as astigmatism and field curvature of the system are further alleviated, which is conducive to achieving a high-resolution optical effect with a uniform image quality throughout the eyepiece system.

In a further embodiment, substrate materials of the spectroscope, the main optical path, and the lenses in the auxiliary optical path are all optical glass materials.

Therefore, the aberrations at various levels of the optical eyepiece system are fully corrected, and the manufacturing cost of optical elements and the weight of the optical system are further controlled.

In a further embodiment, a calculation formula of the aspherical face shape is:

$$z = \frac{cr^2}{1+\sqrt{1-(1+k)c^2r^2}} + \alpha_2 r^2 + \alpha_4 r^4 + \alpha_6 r^6 + \dots;$$

wherein z is a vector height of the optical surface, c is a curvature at the aspheric vertex, and k is an aspheric coefficient, $\alpha$ 2, 4, 6 . . . are coefficients of various orders, and r is a distance coordinate from a point on a curved face to an optical axis of a lens system.

The aberrations (including spherical aberration, coma, distortion, field curvature, astigmatism, chromatic aberration and other higher-order aberrations) of the optical system are fully corrected, which is beneficial for the optical eyepiece system to further improve the image quality of the central field-of-view and the edge field-of-view, reduce the image quality difference between the central field-of-view and the edge field-of-view and thus to achieve more uniform image quality and low distortion in the full frame while realizing a large angle of view and a large aperture.

The principle, solution, and display results of the optical eyepiece system mentioned above will be further elaborated below through more specific examples.

In the following examples, as shown in FIG. 1, an image surface 103, an auxiliary optical path T, a spectroscope 101, and a main optical path A which are sequentially connected are included. An optical axis of the image surface 103 coincides with an optical axis of the auxiliary optical path T; an optical axis of the main optical path A is perpendicular to the optical axis of the auxiliary optical path T; and the optical axis of the main optical path A is reflected by the spectroscope 101 and is superimposed with the auxiliary optical path T transmitted by the spectroscope 101. The main optical path A includes a first lens 106, a second lens 105, and a third lens 104 which are arranged sequentially from the spectroscope 101 to the micro image display 102 in an optical axis direction. The first lens 106 is a positive lens; the second lens 105 is a negative lens; and the third lens 104 is a positive lens. The auxiliary optical path T includes a fourth lens 109, a fifth lens 108, and a sixth lens 107 which are arranged sequentially from the image surface 103 to the spectroscope 101 in the optical axis direction. The image surface 103 may serve as an exit pupil for imaging in the optical eyepiece system, and is a virtual exit aperture capable of observing an optimal imaging result. Light emitted from the micro image display 102 passes through the third lens 104, the second lens 105, and the first lens 106 sequentially, and then is reflected by the spectroscope 101. The light emitted by an object shape observation and photographing apparatus 110 is transmitted by the spectroscope 101, superimposed with the light of the micro image display 102 reflected by the spectroscope 101, and then passes through the sixth lens 107, the fifth lens 108, and the fourth lens 109 sequentially to reach the image surface 103.

Example 1

The eyepiece design data of Example 1 is shown in Table 1:

TABLE 1

| Surface | Curvature radius (mm) | Thickness (mm) | Lens Refractive index | Abbe number | Net caliber (mm) | Cone coefficient |
|---|---|---|---|---|---|---|
| 1 | Infinite | 148.0337 | | | 23.69358 | |
| 2 | −31 | 2.918646 | 1.54739 | 53.631194 | 25.4 | |
| 3 | 75.76519 | 5.070955 | 1.4559 | 90.288026 | 27.97 | |
| 4 | −44.78 | 1.22 | | | 27.97 | |
| 5 | Infinite | 3.52 | 1.518229 | 58.902057 | 27.97 | |
| Diaphragm | −44 | 25 | | | 27.04652 | |
| 7 | Infinite | | | reflection | 46.10744 | |
| 8 | Infinite | −25 | | | | |
| 9 | −23.80855 | −14.63066 | 1.525006 | 70.361017 | 34.58845 | −0.32785 |
| 10 | 162.9895 | −4.287965 | | | 31.10123 | −47.05851 |
| 11 | −86.85466 | −12.09253 | 1.7552 | 27.546239 | 26.25216 | |
| 12 | −14.52471 | −10.16369 | | | 17.84255 | |
| 13 | −22.87601 | −10.12802 | 1.693631 | 49.233011 | 18.37495 | |
| 14 | −88.22126 | −0.637177 | | | 15.66598 | |
| 15 | Infinite | −18.16126 | | | 15.54628 | |
| Image surface | Infinite | | | | 8.018875 | |

FIG. 1 is a 2D structural diagram of the optical eyepiece system in Example 1, including an image surface 103, an auxiliary optical path T, a spectroscope 101, and a main optical path A which are sequentially connected. An optical axis of the image surface 103 coincides with an optical axis of the auxiliary optical path T; an optical axis of the main optical path A is perpendicular to the optical axis of the auxiliary optical path T; and the optical axis of the main optical path A is reflected by the spectroscope 101 and is superimposed with the auxiliary optical path T transmitted by the spectroscope 101. The main optical path A includes a first lens 106, a second lens 105, and a third lens 104 which are arranged sequentially from the spectroscope 101 to the micro image display 102 in an optical axis direction. The first lens 106 is a positive lens; the second lens 105 is a negative lens; and the third lens 104 is a positive lens. The auxiliary optical path T includes a fourth lens 109, a fifth lens 108, and a sixth lens 107 which are arranged sequentially from the image surface 103 to the spectroscope 101 in the optical axis direction. An included angle between the optical axes of the main optical path A and the auxiliary optical path T is set to θ, and the angle θ is less than 180°. An optical surface of the first lens 106 away from the side of the micro image display 102 is concave towards the direction of the micro image display 102, and the optical surface is an even-order aspherical face shape. An optical surface of the second lens 105 near the side of the micro image display 102 is concave towards the direction of the micro image display 102, and the optical surface is a spherical face shape. Substrates of the optical lenses and the spectroscope 101 of the optical system are made of an optical glass material, in which the focal length F of the optical system is 51.53 mm, the focal length $F_1$ of the main optical path A is 62.2 mm, the focal length $F_t$ of the auxiliary optical path T is 180 mm, the image height H is 23.1 mm, and the image height of the micro image display 102 is 8 mm; therefore, $F_1/F$ is 1.207, $F_t/F$ is 3.49, $F_t/F_1$ is 2.89, and h/H is 0.346.

FIG. 2A, FIG. 2B, FIG. 3, and FIG. 4 are a plot of the field, a plot of the distortion, a spot array diagram, and a plot of the optical MTF of the optical system respectively, which reflect that respective field-of-view light in this example has high resolution and very small optical distortion in the unit pixel of the image plane (display device I), the resolution per 20 mm per unit period reaches more than 0.8, the aberration of the optical system and the image drift are well corrected, and a display image of uniformity and high optical performance can be observed through the optical eyepiece system.

Example 2

The eyepiece design data of Example 2 is shown in Table 2:

TABLE 2

| Surface | Curvature radius (mm) | Thickness (mm) | Lens Refractive index | Abbe number | Net caliber (mm) | Cone coefficient |
|---|---|---|---|---|---|---|
| 1 | Infinite | 148.03 | | | 23.69884 | |
| 2 | −31.00 | 2.92 | 1.55 | 53.63 | 27.97 | |
| 3 | 75.76519 | 5.070955 | 1.455 | 90.288026 | 27.97 | |
| 4 | −44.78 | 1.22 | | | 27.97 | |
| 5 | Infinite | 3.52 | 1.51 | 58.90 | 27.97 | |
| Diaphragm | −44 | 30 | | | 27.97 | |
| 7 | Infinite | −50 | | reflection | 47.1113 | |
| 8 | −23.89 | −13.87 | 1.50 | 81.63 | 38.7146 | −0.2559616 |

TABLE 2-continued

| Surface | Curvature radius (mm) | Thickness (mm) | Lens Refractive index | Abbe number | Net caliber (mm) | Cone coefficient |
|---|---|---|---|---|---|---|
| 9 | 82.8523 | −2.912072 | | | 38.7146 | −10.06758 |
| 10 | −176.71 | −9.99 | 1.80 | 34.97 | 31.33882 | |
| 11 | −18.23459 | −6.257703 | | | 31.33882 | |
| 12 | −34.76673 | −7.27494 | 1.9228 | 20.882149 | 23.32053 | |
| 13 | −43.98243 | −39.29188 | | | 23.32053 | |
| 14 | Infinite | −18.16126 | | | 17.4725 | |
| Image surface | Infinite | | | | 15.60402 | |

Figure 5:
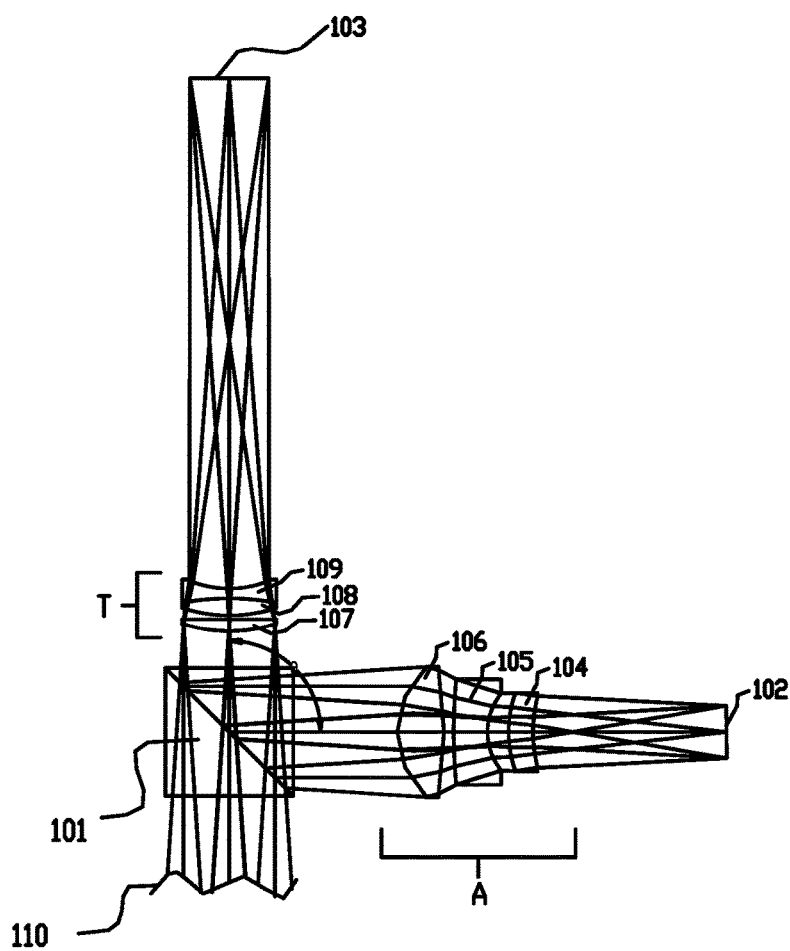
FIG. 5 is an optical path diagram of an optical eyepiece system according to Example 2 of the present invention.
Figure 6A:
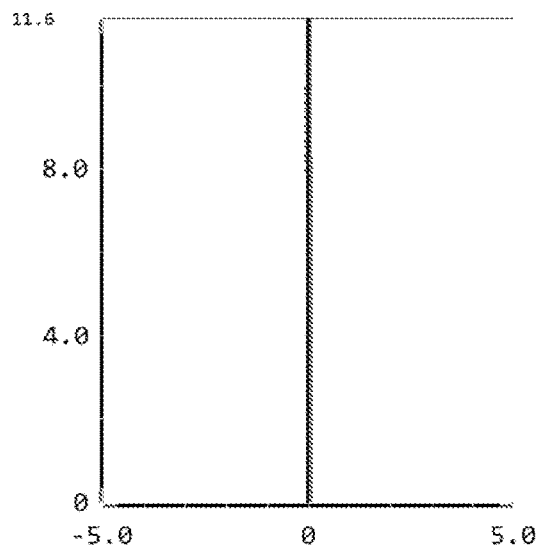
FIG. 6A is a plot of the field of the optical eyepiece system according to Example 2 of the present invention.
Figure 6B:
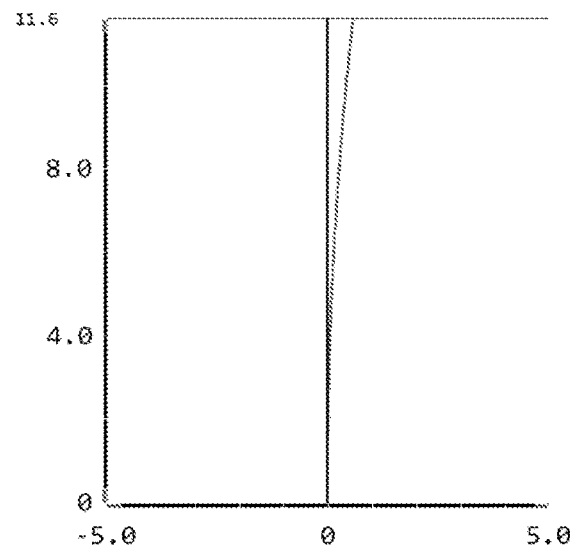
FIG. 6B is a plot of the distortion of the optical eyepiece system according to Example 2 of the present invention.
Figure 7:
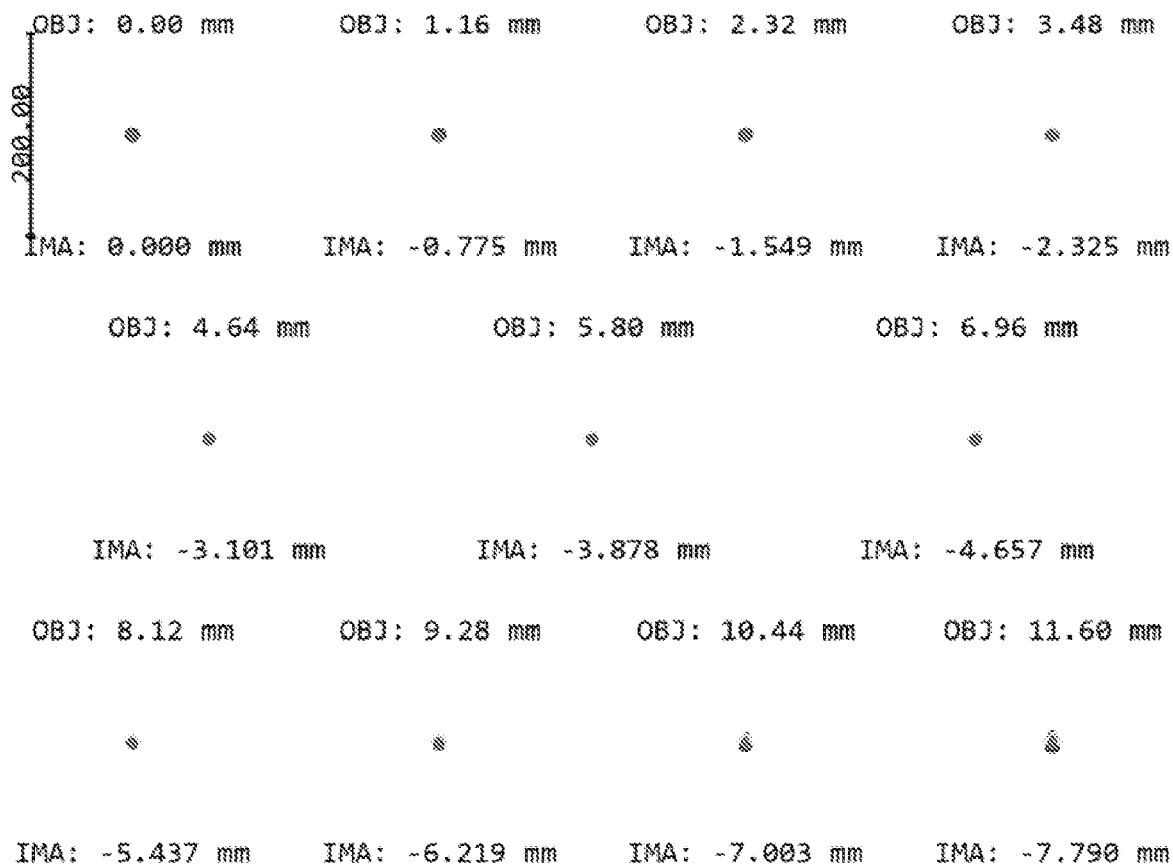
FIG. 7 is a schematic spot array diagram of the optical eyepiece system according to Example 2 of the present invention.
Figure 8:
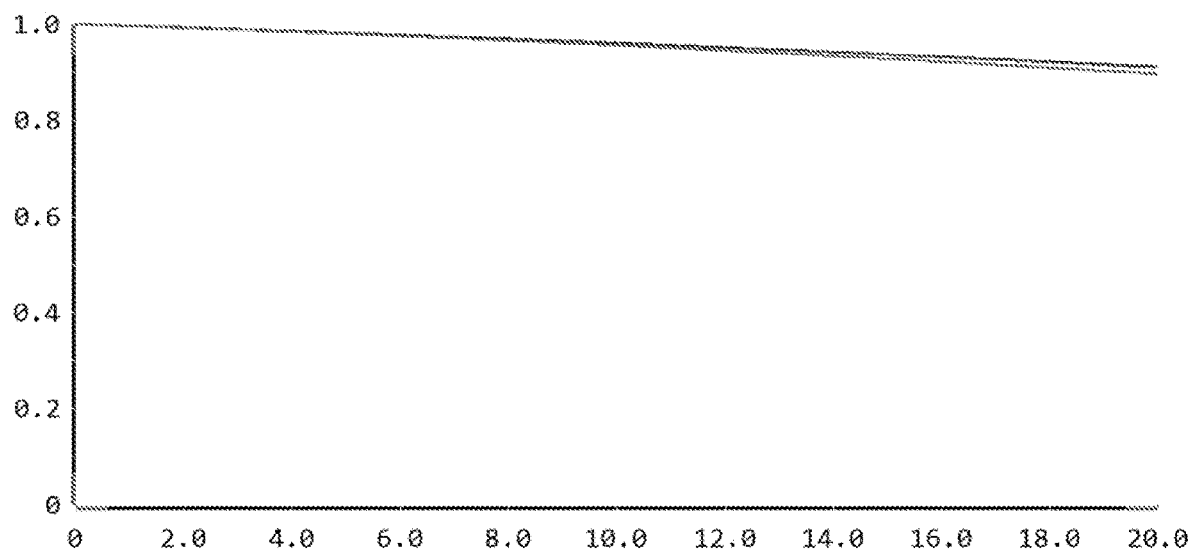
FIG. 8 is a plot of the optical MTF of the optical eyepiece system according to Example 2 of the present invention.

FIG. 5 is a 2D structural diagram of the optical eyepiece system in Example 2, including an image surface 103, an auxiliary optical path T, a spectroscope 101, and a main optical path A which are sequentially connected. An optical axis of the image surface 103 coincides with an optical axis of the auxiliary optical path T; an optical axis of the main optical path A is perpendicular to the optical axis of the auxiliary optical path T; and the optical axis of the main optical path A is reflected by the spectroscope 101 and is superimposed with the auxiliary optical path T transmitted by the spectroscope 101. The main optical path A includes a first lens 106, a second lens 105, and a third lens 104 which are arranged sequentially from the spectroscope 101 to the micro image display 102 in an optical axis direction. The first lens 106 is a positive lens; the second lens 105 is a negative lens; and the third lens 104 is a positive lens. The auxiliary optical path T includes a fourth lens 109, a fifth lens 108, and a sixth lens 107 which are arranged sequentially from the image surface 103 to the spectroscope 101 in the optical axis direction. An included angle between the optical axes of the main optical path A and the auxiliary optical path T is set to θ, and the angle θ is less than 180°.

An optical surface of the first lens 106 away from the side of the micro image display 102 is concave towards the direction of the micro image display 102, and the optical surface is an even-order aspherical face shape. An optical surface of the second lens 105 near the side of the micro image display 102 is concave towards the direction of the micro image display 102, and the optical surface is a spherical face shape. Substrates of the optical lenses and the spectroscope 101 of the optical system are made of an optical glass material, in which the focal length F of the optical system is 69.7 mm, the focal length $F_1$ of the main optical path A is 38.9 mm, the focal length $F_t$ of the auxiliary optical path T is 180 mm, the image height H of the image surface 103 is 23.2 mm, and the micro image display 102 is 15.6 mm; therefore, $F_1/F$ is 0.558, $F_t/F$ is 2.58, $F_t/F_1$ is 4.63, and h/H is 0.67.

FIG. 6A, FIG. 6B, FIG. 7, and FIG. 8 are a plot of the field, a plot of the distortion, a spot array diagram, and a plot of the optical MTF of the optical system respectively, which reflect that respective field-of-view light in this example has high resolution and very small optical distortion in the unit pixel of the image plane (display device I), the resolution per 20 mm per unit period reaches more than 0.8, the aberration of the optical system and the image drift are well corrected, and a display image of uniformity and high optical performance can be observed through the optical eyepiece system.

Example 3

The eyepiece design data of Example 3 is shown in Table 3:

TABLE 3

| Surface | Curvature radius (mm) | Thickness (mm) | Lens Refractive index | Abbe number | Net caliber (mm) | Cone coefficient |
|---|---|---|---|---|---|---|
| 1 | Infinite | 148.0337 | | | 23.69884 | |
| 2 | −31 | 2.918646 | 1.54739 | 53.631194 | 25.4 | |
| 3 | 75.76519 | 5.070955 | 1.455999 | 90.288026 | 27.97 | |
| 4 | −44.78 | 1.22 | | | 27.97 | |
| 5 | Infinite | 3.52 | 1.51822 | 58.902057 | 27.97 | |
| Diaphragm | −44 | 30 | | | 27.04652 | |
| 7 | Infinite | −50 | | reflection | 47.1113 | |
| 8 | −22.90033 | −13.79309 | 1.433848 | 95.232905 | 38.75675 | −0.2109277 |
| 9 | 56.36896 | −0.4813651 | | | 37.61132 | −6.96765 |
| 10 | −172.6911 | −12.75711 | 1.809995 | 41.000073 | 33.80343 | |
| 11 | −19.6756 | −4.489196 | | | 23.96701 | |
| 12 | −36.88112 | −12.18637 | 2.0017 | 20.705366 | 24.1008 | |
| 13 | −37.66881 | −40.54678 | | | 20.48089 | |
| 14 | Infinite | −18.16126 | | | 17.83071 | |
| Image surface | Infinite | | | | 16.60221 | |

Figure 9:
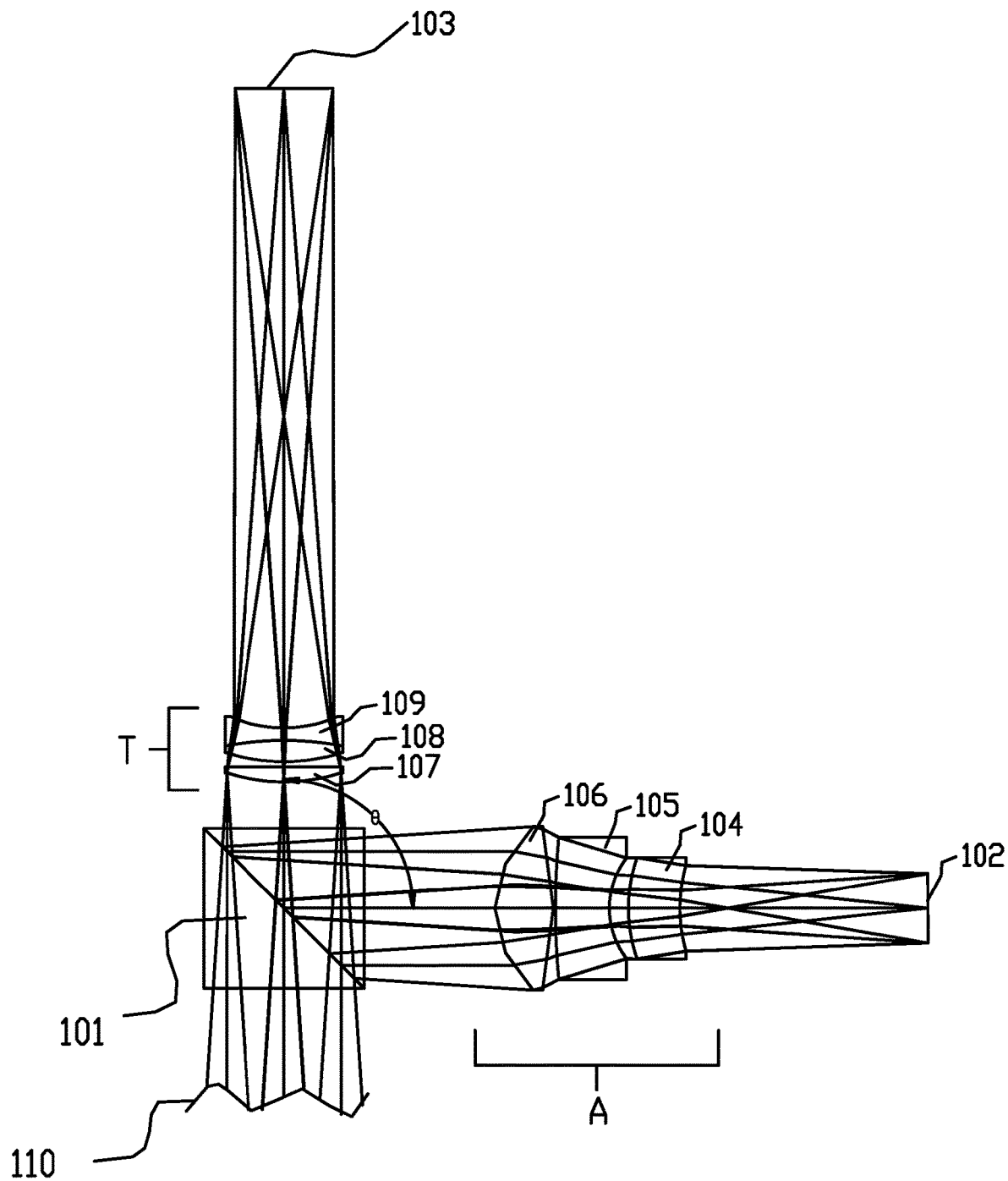
FIG. 9 is an optical path diagram of an optical eyepiece system according to Example 3 of the present invention.
Figure 10A:
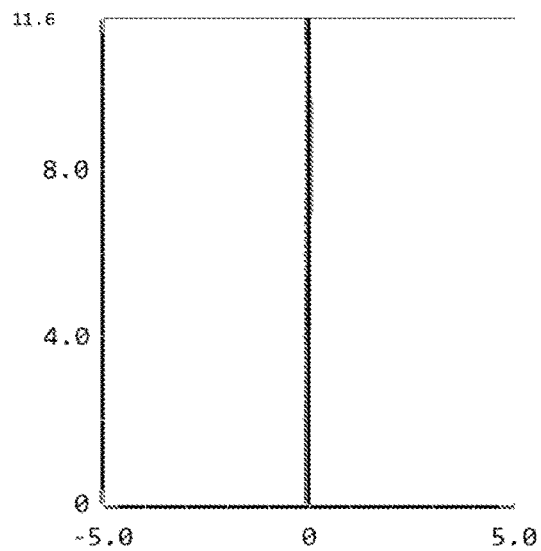
FIG. 10A is a plot of the field of the optical eyepiece system according to Example 3 of the present invention.
Figure 10B:
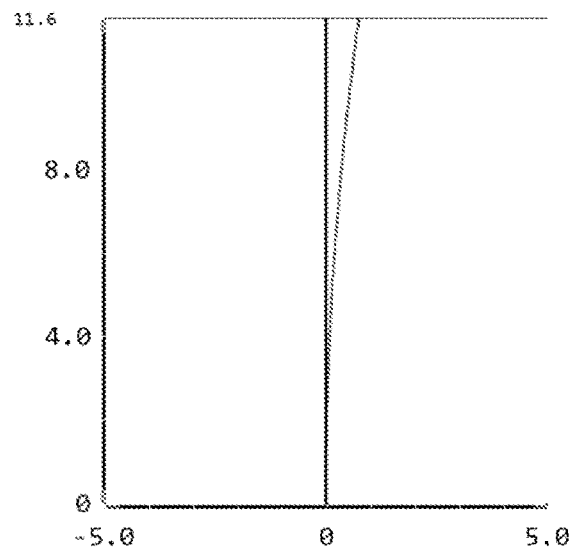
FIG. 10B is a plot of the distortion of the optical eyepiece system according to Example 3 of the present invention.
Figure 11:
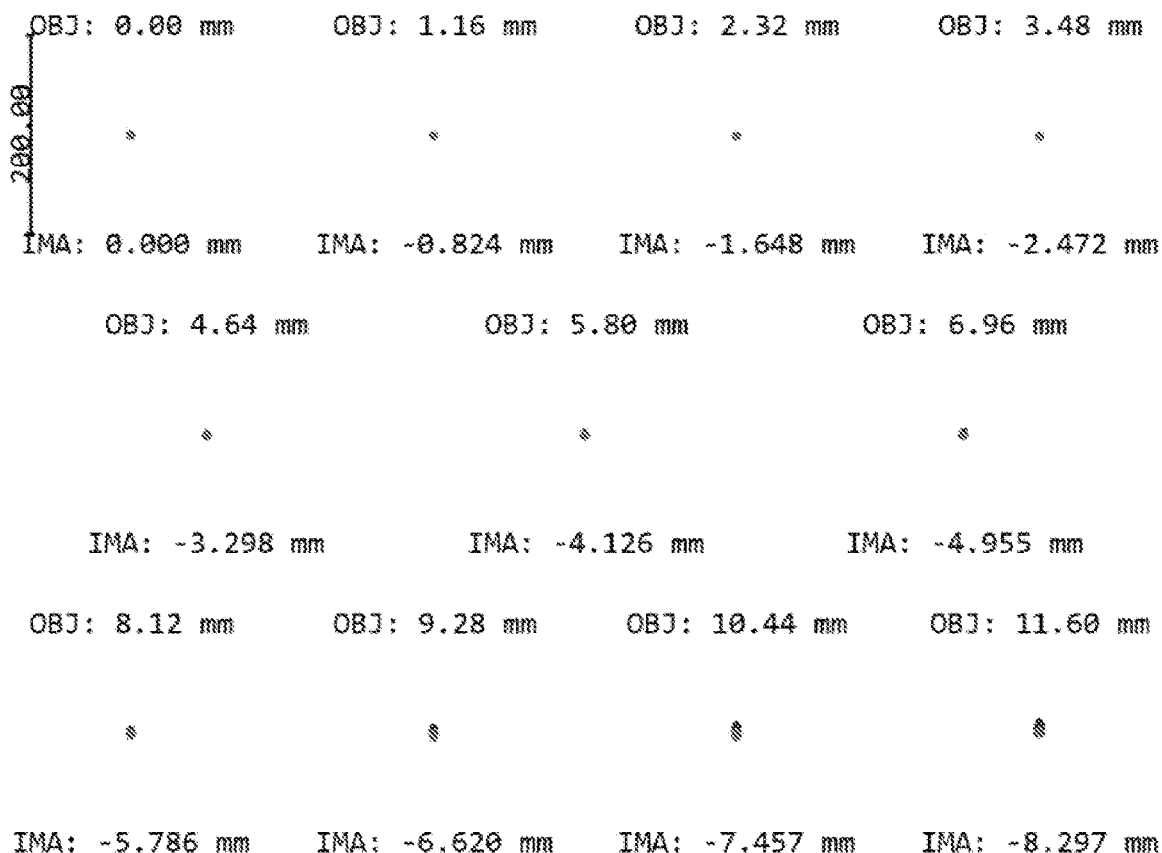
FIG. 11 is a schematic spot array diagram of the optical eyepiece system according to Example 3 of the present invention.
Figure 12:
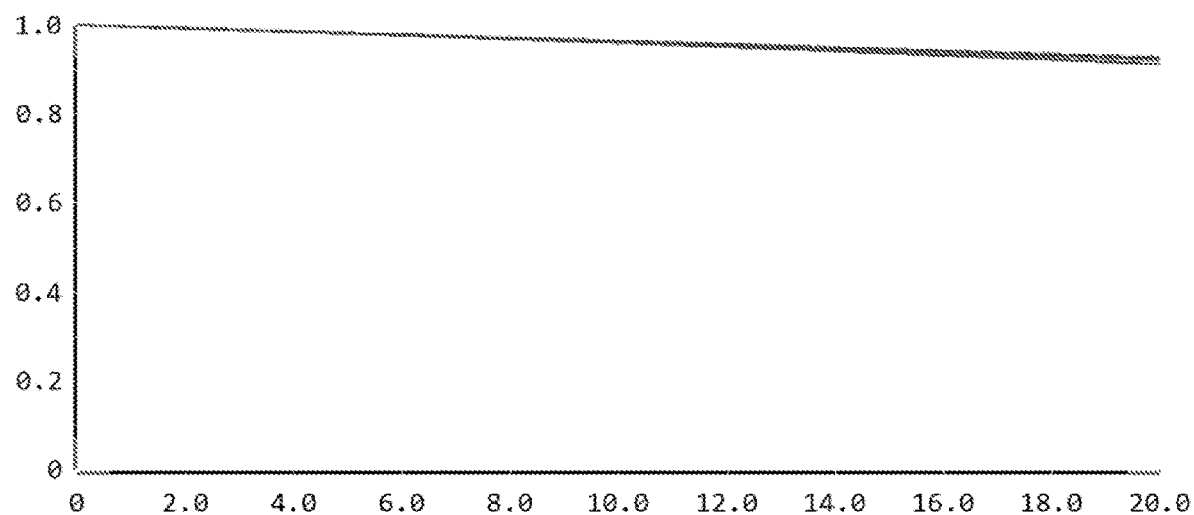
FIG. 12 is a plot of the optical MTF of the optical eyepiece system according to Example 3 of the present invention.

FIG. 9 is a 2D structural diagram of the optical eyepiece system in Example 3, including an image surface 103, an auxiliary optical path T, a spectroscope 101, and a main optical path A which are sequentially connected. An optical axis of the image surface 103 coincides with an optical axis of the auxiliary optical path T; an optical axis of the main optical path A is perpendicular to the optical axis of the auxiliary optical path T; and the optical axis of the main optical path A is reflected by the spectroscope 101 and is superimposed with the auxiliary optical path T transmitted by the spectroscope 101. The main optical path A includes a first lens 106, a second lens 105, and a third lens 104 which are arranged sequentially from the spectroscope 101 to the micro image display 102 in an optical axis direction. The first lens 106 is a positive lens; the second lens 105 is a negative lens; and the third lens 104 is a positive lens. The auxiliary optical path T includes a fourth lens 109, a fifth lens 108, and a sixth lens 107 which are arranged sequentially from the image surface 103 to the spectroscope 101 in the optical axis direction. An included angle between the optical axes of the main optical path A and the auxiliary optical path T is set to θ, and the angle θ is less than 180°. An optical surface of the first lens 106 away from the side of the micro image display 102 is concave towards the direction of the micro image display 102, and the optical surface is an even-order aspherical face shape. An optical surface of the second lens 105 near the side of the micro image display 102 is concave towards the direction of the micro image display 102, and the optical surface is a spherical face shape. Substrates of the optical lenses and the spectroscope 101 of the optical system are made of an optical glass material, in which the focal length F of the optical system is 69.9 mm, the focal length $F_1$ of the main optical path A is 127.38 mm, the focal length $F_t$ of the auxiliary optical path T is 180 mm, the image height H of the image surface 103 is 23.2 mm, and the micro image display 102 is 16.6 mm; therefore, $F_1/F$ is 1.82, $F_t/F$ is 2.575, $F_t/F_1$ is 1.41, and h/H is 0.716.

FIG. 10A, FIG. 10B, FIG. 11, and FIG. 12 are a plot of the field, a plot of the distortion, a spot array diagram, and a plot of the optical MTF of the optical system respectively, which reflect that respective field-of-view light in this example has high resolution and very small optical distortion in the unit pixel of the image plane (a display device I), the resolution per 20 mm per unit period reaches more than 0.9, the aberration of the optical system and the image drift are well corrected, and a display image of uniformity and high optical performance can be observed through the optical eyepiece system.

Example 4

Figure 13:
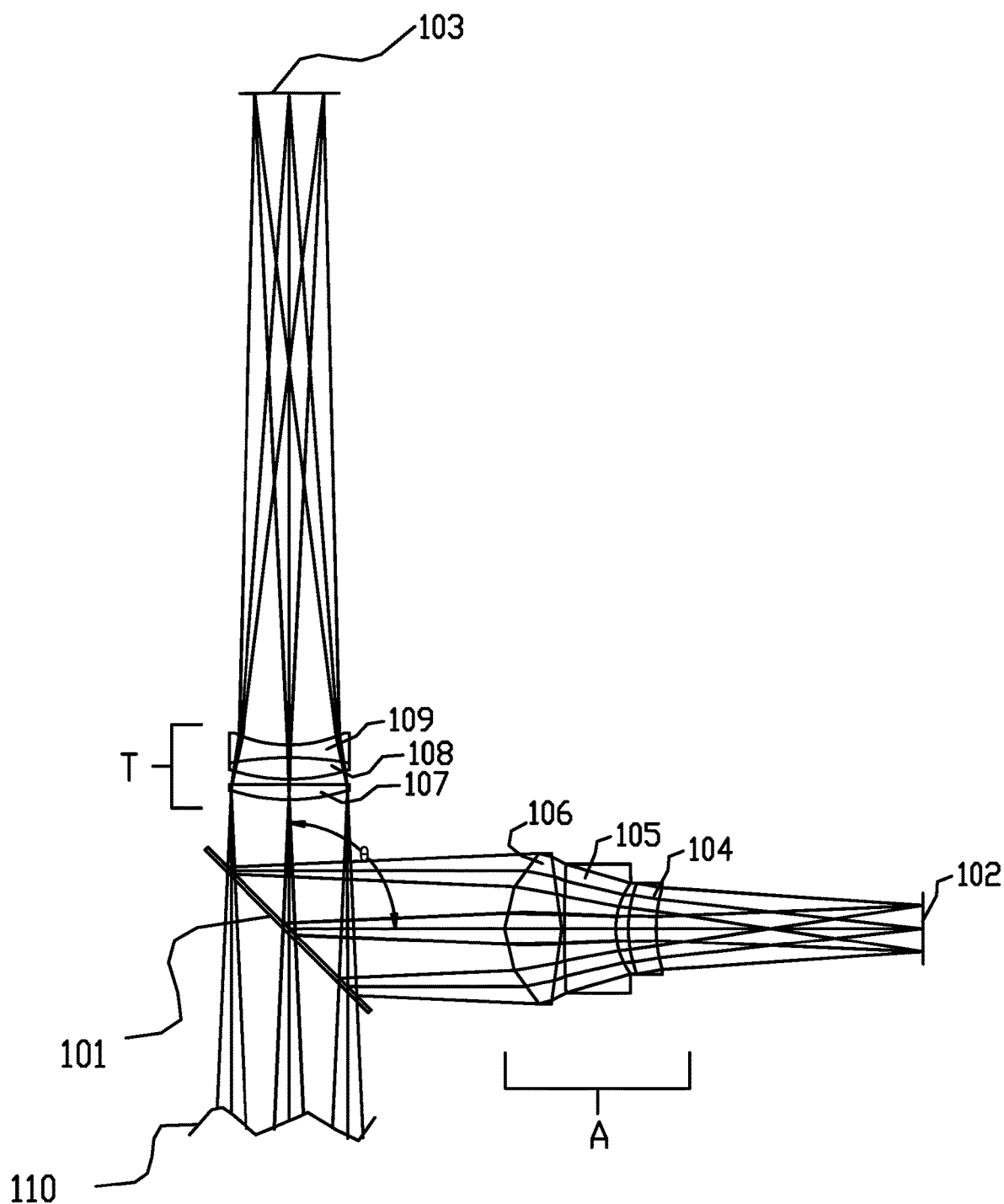
FIG. 13 is an optical path diagram of an optical eyepiece system according to Example 4 of the present invention.
Figure 16:
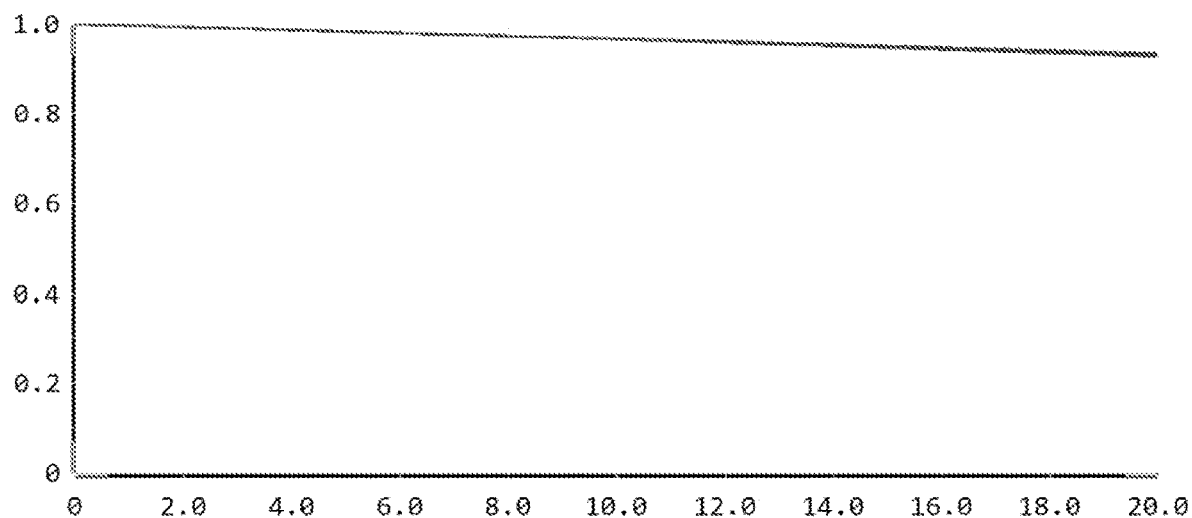
FIG. 16 is a plot of an optical MTF of the optical eyepiece system according to Example 4 of the present invention.

The eyepiece design data of Example 4 is shown in Table 4:

FIG. 13 is a 2D structural diagram of the optical eyepiece system in Example 4, including an image surface 103, an auxiliary optical path T, a spectroscope 101, and a main optical path A which are sequentially connected. An optical axis of the image surface 103 coincides with an optical axis of the auxiliary optical path T; an optical axis of the main optical path A is perpendicular to the optical axis of the auxiliary optical path T; and the optical axis of the main optical path A is reflected by the spectroscope 101 and is superimposed with the auxiliary optical path T transmitted by the spectroscope 101. The main optical path A includes a first lens 106, a second lens 105, and a third lens 104 which are arranged sequentially from the spectroscope 101 to the micro image display 102 in an optical axis direction. The first lens 106 is a positive lens; the second lens 105 is a negative lens; and the third lens 104 is a positive lens. The auxiliary optical path T includes a fourth lens 109, a fifth lens 108, and a sixth lens 107 which are arranged sequentially from the image surface 103 to the spectroscope 101 in the optical axis direction. An included angle between the optical axes of the main optical path A and the auxiliary optical path T is set to θ, and the angle θ is less than 180°. An optical surface of the first lens 106 away from the side of the micro image display 102 is concave towards the direction of the micro image display 102, and the optical surface is an even-order aspherical face shape. An optical surface of the second lens 105 near the side of the micro image display 102 is concave towards the direction of the micro image display 102, and the optical surface is a spherical face shape. Substrates of the optical lenses and the spectroscope 103 of the optical system are made of an optical glass material, in which the focal length F of the optical system is 69.18 mm, the focal length $F_1$ of the main optical path A is 121.22 mm, the focal length $F_t$ of the auxiliary optical path T is 180 mm, the image height H of the image surface 103 is 16.0 mm, and the miniature image displayer 102 is 10.86 mm; therefore, $F_1/F$ is 1.75, $F_t/F$ is 2.60, $F_t/F_1$ is 1.48, and h/H is 0.679.

FIG. 14A, FIG. 14B, FIG. 15, and FIG. 16 are a plot of the field, a plot of the distortion, a spot array diagram, and a plot of the optical MTF of the optical system respectively, which reflect that respective field-of-view light in this example has high resolution and very small optical distortion in the unit pixel of the image plane (a display device I),

TABLE 4

| Surface | Curvature radius (mm) | Thickness (mm) | Lens Refractive index | Abbe number | Net caliber (mm) | Cone coefficient |
|---|---|---|---|---|---|---|
| 1 | Infinite | 148.0337 | | | 23.28599 | |
| 2 | −31 | 2.918646 | 1.5473 | 53.631194 | 25.4 | |
| 3 | 75.76519 | 5.070955 | 1.4559 | 90.288026 | 27.97 | |
| 4 | −44.78 | 1.22 | | | 27.97 | |
| 5 | Infinite | 3.52 | 1.5182 | 58.902057 | 27.97 | |
| Diaphragm | −44 | 30 | | | 27.04652 | |
| 7 | Infinite | −50 | | reflection | 44.26069 | |
| 8 | −21.1802 | −13.26724 | 1.43384 | 95.232905 | 35.06626 | −0.210379 |
| 9 | 47.53492 | −0.5829584 | | | 33.5649 | −5.526316 |
| 10 | −290.404 | −11.93197 | 1.80999 | 41.000073 | 30.06518 | |
| 11 | −18.2567 | −2.895757 | | | 21.25985 | |
| 12 | −29.76085 | −6.465275 | 2.0017 | 20.705366 | 21.30269 | |
| 13 | −33.80287 | −43.7713 | | | 19.18065 | |
| 14 | Infinite | −18.16126 | | | 13.34953 | |
| Image surface | Infinite | | | | 10.85277 | | the resolution per 20 mm per unit period reaches more than 0.9, the aberration of the optical system and the image drift are well corrected, and a display image of uniformity and high optical performance can be observed through the optical eyepiece system.

The data of the above-mentioned Examples 1 to 4 all satisfy the parameter requirements recorded in the Summary of the present invention, and the results are shown in the following 5:

TABLE 5

|  | $F_1/F$ | $F_t/F$ | $F_t/F_1$ | h/H |
|---|---|---|---|---|
| Example 1 | 1.21 | 3.49 | 2.89 | 0.35 |
| Example 2 | 0.56 | 2.58 | 4.63 | 0.67 |
| Example 3 | 1.82 | 2.58 | 1.41 | 0.72 |
| Example 4 | 1.75 | 2.60 | 1.48 | 0.68 |

The present invention further provides a head-mounted display device, including a micro image display and an object shape observation and photographing apparatus, and further including the optical eyepiece system according to any one of the above contents.

Preferably, the micro image display includes an organic electroluminescent light-emitting device, a transmissive liquid crystal display, or a reflective liquid crystal display.

Preferably, the object shape observation and photographing apparatus includes but is not limited to a microscope or a telescope.

The head-mounted display device employs an optical eyepiece system capable of superimposing optical paths, the system superimposes imaging light in a semi-transparent and semi-reflective manner, the optical axis of the main optical path is reflected by the spectroscope and then superimposed with the optical axis of the auxiliary optical path projected by the spectroscope, an image displayed by the micro image display and a physical object image captured by an object shape observation and photographing apparatus are displayed in a superimposing mode, and effects of high definition and high coincidence are achieved through a positive, negative, and positive lens combination and the feature relationships among optical components, thereby achieving the characteristics of being clearer in imaging, small in distortion, and high in imaging quality, so that the imaging of the micro image display and the imaging and superimposing of dual optical paths are more perfectly realistic.

In specific practical applications, the user explains, analyzes, and processes images of the optical instrument through multiple imaging superimposing and displaying, so that people who are not proficient in the optical instrument can also better operate and make judgments.

It should be understood that, for one of ordinary skill in the art, the foregoing description can be modified or altered, and all such modifications and alterations fall into the scope of the attached claims of the present invention.

What is claimed is:

1. An optical eyepiece system capable of superimposing optical paths, comprising an image surface, an auxiliary optical path, a spectroscope, and a main optical path which are sequentially connected; wherein an optical axis of the image surface coincides with an optical axis of the auxiliary optical path; an optical axis of the main optical path is mutually perpendicular to the optical axis of the auxiliary optical path; and the optical axis of the main optical path is reflected by the spectroscope and is superimposed with the auxiliary optical path transmitted by the spectroscope;

the main optical path comprises a first lens, a second lens, and a third lens which are arranged sequentially from the spectroscope to a micro image display in an optical axis direction; the first lens is a positive lens; the second lens is a negative lens; and the third lens is a positive lens;

the auxiliary optical path comprises a fourth lens, a fifth lens, and a sixth lens which are arranged sequentially from the image surface to the spectroscope in the optical axis direction; and an effective focal length of the optical system is set to F, an effective focal length of the main optical path is set to $F_1$, and an effective focal length of the auxiliary optical path is set to $F_t$, and F, $F_1$, and $F_t$ satisfy the following relations (1) and (2):

$$0.558 \leq F_1/F \leq 1.822 \tag{1};$$

$$2.265 \leq F_t/F \leq 3.493 \tag{2};$$

wherein an optical surface of the first lens away from the side of the micro image display is concave towards a direction of the micro image display, and the optical surface is an even-order aspherical face shape.

2. The optical eyepiece system capable of superimposing optical paths according to claim 1, wherein the effective focal length of the main optical path is $F_1$, the effective focal length of the auxiliary optical path is $F_t$, and $F_1$ and $F_t$ satisfy the following relation (3):

$$1.413 \leq F_t/F_1 \leq 4.63 \tag{3}.$$

3. The optical eyepiece system capable of superimposing optical paths according to claim 1, wherein an image height of the image surface is set to H, an image height of the micro image display is set to h, and H and h satisfy the following relation (4):

$$0.346 \leq h/H \leq 0.716 \tag{4}.$$

4. The optical eyepiece system capable of superimposing optical paths according to claim 1, wherein the light reflectivity of the spectroscope is set to μ, the transmissivity of the spectroscope is n, and μ and n satisfy the following relation (5):

$$80\% \leq \mu+n \leq 100\% \tag{5}.$$

5. The optical eyepiece system capable of superimposing optical paths according to claim 1, wherein an included angle between the optical axes of the main optical path and the auxiliary optical path is set to θ, and θ satisfies the following relation (6):

$$\theta < 180° \tag{6}.$$

6. The optical eyepiece system capable of superimposing optical paths according to claim 1, wherein the fourth lens is a negative lens; and the fifth lens and the sixth lens are positive lenses.

7. The optical eyepiece system capable of superimposing optical paths according to claim 1, wherein an optical surface of the second lens near the side of the micro image display is concave towards the direction of the micro image display, and the optical surface is a spherical face shape.

8. The optical eyepiece system capable of superimposing optical paths according to claim 1, wherein substrate materials of the spectroscope, the main optical path, and the lenses in the auxiliary optical path are all optical glass materials.

9. A head-mounted display device, comprising a micro image display and an object shape observation and photographing apparatus, and further comprising the optical eyepiece system according to claim 1.

10. The head-mounted display device according to claim 9, wherein the micro image display comprises an organic electroluminescent light-emitting device, a transmissive liquid crystal display, or a reflective liquid crystal display.

11. The head-mounted display device according to claim 9, wherein the object shape observation and photographing apparatus comprises but is not limited to a microscope or a telescope.

12. An optical eyepiece system capable of superimposing optical paths, comprising an image surface, an auxiliary optical path, a spectroscope, and a main optical path which are sequentially connected; wherein an optical axis of the image surface coincides with an optical axis of the auxiliary optical path; an optical axis of the main optical path is mutually perpendicular to the optical axis of the auxiliary optical path; and the optical axis of the main optical path is reflected by the spectroscope and is superimposed with the auxiliary optical path transmitted by the spectroscope;

the main optical path comprises a first lens, a second lens, and a third lens which are arranged sequentially from the spectroscope to a micro image display in an optical axis direction; the first lens is a positive lens; the second lens is a negative lens; and the third lens is a positive lens;

the auxiliary optical path comprises a fourth lens, a fifth lens, and a sixth lens which are arranged sequentially from the image surface to the spectroscope in the optical axis direction; and an effective focal length of the optical system is set to F, an effective focal length of the main optical path is set to $F_1$, and an effective focal length of the auxiliary optical path is set to $F_t$, and F, $F_1$, and $F_t$ satisfy the following relations (1) and (2):

$$0.558 \leq F_1/F \leq 1.822 \quad (1);$$

$$2.265 \leq F_t/F \leq 3.493 \quad (2);$$

wherein the fourth lens is a negative lens; and the fifth lens and the sixth lens are positive lenses.

13. An optical eyepiece system capable of superimposing optical paths, comprising an image surface, an auxiliary optical path, a spectroscope, and a main optical path which are sequentially connected; wherein an optical axis of the image surface coincides with an optical axis of the auxiliary optical path; an optical axis of the main optical path is mutually perpendicular to the optical axis of the auxiliary optical path; and the optical axis of the main optical path is reflected by the spectroscope and is superimposed with the auxiliary optical path transmitted by the spectroscope;

the main optical path comprises a first lens, a second lens, and a third lens which are arranged sequentially from the spectroscope to a micro image display in an optical axis direction; the first lens is a positive lens; the second lens is a negative lens; and the third lens is a positive lens;

the auxiliary optical path comprises a fourth lens, a fifth lens, and a sixth lens which are arranged sequentially from the image surface to the spectroscope in the optical axis direction; and an effective focal length of the optical system is set to F, an effective focal length of the main optical path is set to $F_1$, and an effective focal length of the auxiliary optical path is set to $F_t$, and F, $F_1$, and $F_t$ satisfy the following relations (1) and (2):

$$0.558 \leq F_1/F \leq 1.822 \quad (1);$$

$$2.265 \leq F_t/F \leq 3.493 \quad (2);$$

wherein an optical surface of the second lens near the side of the micro image display is concave towards the direction of the micro image display, and the optical surface is a spherical face shape.

\* \* \* \* \*